Sept. 4, 1928.  
J. A. AUSTIN  
1,682,731  
BUMPER ACTUATED CONTROL MECHANISM  
Filed April 11, 1927  2 Sheets-Sheet 2
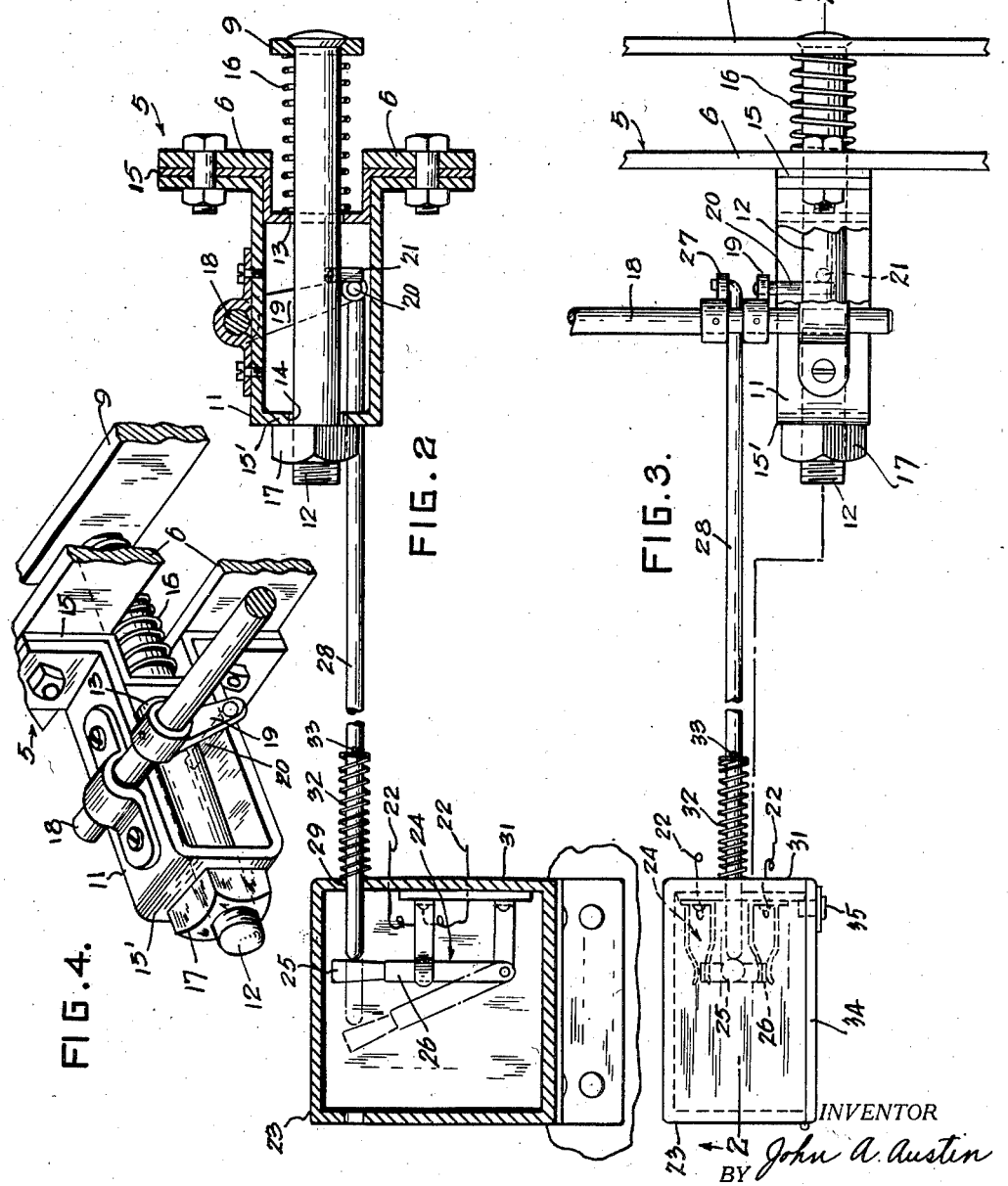
INVENTOR  
John A. Austin  
BY  
M. C. Frank  
ATTORNEY Patented Sept. 4, 1928.

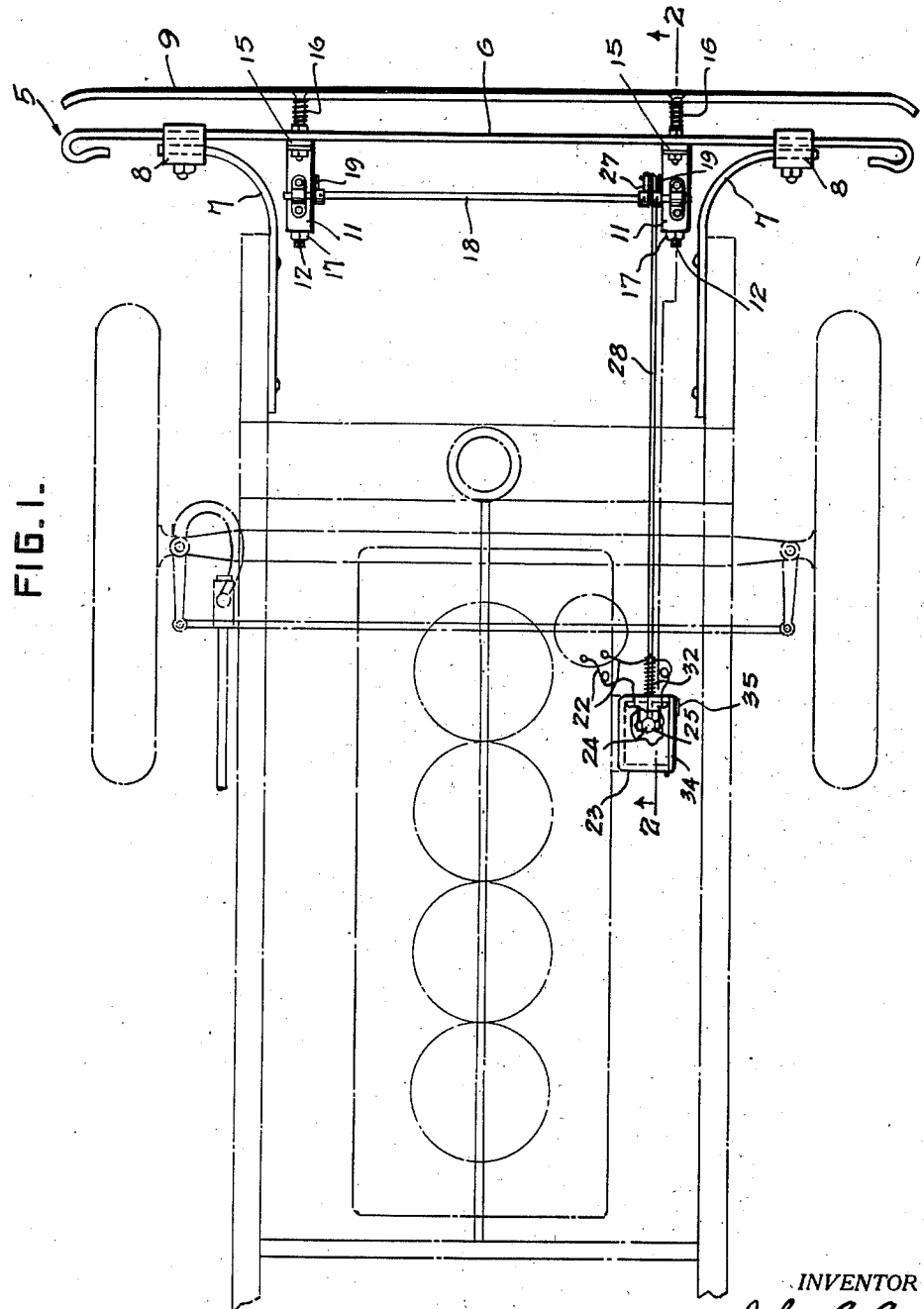

1,682,731

UNITED STATES PATENT OFFICE.

JOHN A. AUSTIN, OF SAN FRANCISCO, CALIFORNIA, ASSIGNOR, BY DIRECT AND MESNE ASSIGNMENTS, OF TWO-THIRDS TO ERNEST A. SEYLER, OF OAKLAND, CALIFORNIA.

BUMPER-ACTUATED CONTROL MECHANISM.

Application filed April 11, 1927. Serial No. 182,689.

My invention relates to a bumper mechanism arranged to automatically effect the stoppage of a power-propelled vehicle on which it is mounted upon contact of the bumper with a resisting object.

An object of the invention is to provide a particularly simple device of the class described whereby a controlling part of the propelling mechanism of the vehicle will be rendered inoperative when the bumper strikes a resisting object.

Another object of the invention is to provide a device of the character described whereby the restoration of said part of the propelling mechanism to its operative condition following a collision of the vehicle with a resisting object, involves the use of a special key and thereby prevents a too prompt driving away of a vehicle by its operator following a collision thereof with a person or other object.

Because of the ever increasing traffic and the increasing number of "hit-and-run" drivers, I anticipate that the installation of automatic devices on all vehicles will be mandatory by law in due time, for the stoppage of vehicles striking objects, so with this in view, a further object of my invention is the provision of a device of the character described which will "cut in" on the ignition circuit or gasoline feed circuit of the vehicle and render the vehicle inoperative until the circuit is closed; the latter being accomplished manually by, first, causing the driver to dismount, then, second, to unlock the cabinet housing the circuit control, and, thirdly, to manually close the circuit switch or gasoline circuit valve. The time consumed to perform these three operations will give bystanders an opportunity to take the driver's license number. The lock and key to the cabinet is to be of a type approved by law.

The invention possesses other objects and features of advantage, some of which, with the foregoing, will be set forth in the following description of a preferred form of the invention which is illustrated in the accompanying drawings, in which:

Figure 1 is a plan view of the device, with a portion of a vehicle chassis on which it is mounted indicated in dotted lines.

Figure 2 is an enlarged sectional view taken substantially on the line 2—2 in Figure 1.

Figure 3 is a plan view of the parts shown in Figure 2.

Figure 4 is a perspective view of a portion of the device.

As herewith particularly disclosed, the device of my invention is incorporated with a bumper 5 of a usual type and comprising one or more bars 6 carried on brackets 7 fixed thereto adjacent opposite ends thereof by means of clamps 8, and arranged to be secured to appropriate members of a vehicle chassis for disposal across the front side of the vehicle as a guard. Mounted on the bumper 5 to lie forwardly thereof in general parallel relation thereto is a secondary bumper 9, such bumper comprising a single bar and being yieldingly mounted with respect to the relatively unyielding bumper 5, whereby contact with a resisting object is arranged to effect a displacement of bumper 9 toward the bumper 5.

Support for the bumper 9 is provided by means of the slidable engagement in brackets 11 of push-rods 12, which rods 12 are welded or otherwise secured to the bumper 9 and extend rearwardly of the bumper 5, the brackets 11 being preferably mounted on the latter adjacent opposite ends thereof. The bumper 5 comprises a pair of bars 6 disposed in spaced and superposed relation and the brackets 11 are conveniently connected to both of the bars 6 and are arranged to provide for the disposition of the rods 12 between the bars and transversely thereof. The brackets 11, it will now be noted, extend generally rearwardly of the bumper 5, and each provides spaced bearings 13 and 14 for the rod 12 whereby the latter may extend longitudinally therethrough in fixed angular relation to the bumper bars 6. Operatively interposed between the bracket portion 15 providing the bearing 13 and the bumper, and encircling the rod 12, is a compression spring 16, while fixed on the inner extremity of the rod 12 to bear against the rear side of the bracket portion 15' providing the bearing 14 is a nut 17—in this manner, the springs 16 tend to maintain the bumper 9 spaced ahead of the bumper 5 with the nut 17 normally engaging the bracket portion 15'. Preferably, and as here shown, the bracket portion 15 is disposed sufficiently rearwardly of the bumper bars 6 to permit the bumper 9 to bear against the bumper 5 before the springs 16 are completely compressed whereby the greatest collision thrust will be borne directly by the bumper 5.

Journalled on, and extending between the brackets 11, is a shaft 18, such shaft being arranged to be rotated by and upon a rearward displacement of one or both of the rods 12 in their bearings. As here shown, the necessary operative connection between each rod 12 and the shaft 18 is provided by means of crank arms 19 fixed to the shaft and provided with extensions 20 arranged to be normally disposed with their forward sides in engagement with pins 21 fixed to the rods 12 whereby an inward displacement of either, or both, ends of the bumper 9 will produce a rotative displacement of the shaft, it being noted that the strength of springs 16 is preferably such as will permit a rearward displacement of the bumper 9 to a position against the bumper 5 following an impact of the latter with a movable or fixed object. Preferably, and as here shown, the pins 21 are fixed to the rods 12 between the bracket portions 15 and 15' whereby the side thrust of the rods in their bearings will be minimized.

It will now be noted that the rotative displacement of the shaft 18 produced by the impact of a collision is arranged to be utilized to cause a stoppage of the operative mechanism of the vehicle. As here shown, the device of my invention is particularly disclosed as associated with a vehicle propelled by an internal combustion engine, having an electric ignition system and is arranged to effect a stoppage of the engine by opening the ignition circuit 22 thereof. Mounted in a cabinet 23 and operatively connected in the circuit 22 is a normally closed knife-switch 24 having a handle 25 of insulating material extending from the blade 26 of the switch. Fixed to the shaft 18 is a lever arm 27 at the extremity of which is pivotally attached a rod 28, which rod is arranged, upon the rotative displacement of the shaft by a rod 12, to effect an opening of the switch 24.

As here shown, the rod 28 is extended through a bearing perforation 29 provided in a wall 31 of the switch cabinet 23 to normally contact with the switch handle 25. Preferably, the rod 28 is disposed in parallel relation to the plane of movement of the switch blade 26 and is directed transversely against the switch handle when the switch is closed.

Means are provided for urging the shaft cranks 19 to maintain their engagement with the pins 21 of the thrust rods 12 and at the same time to maintain the rod 28 in its normally inoperative and contacting relation with the switch handle, such means comprises a compression spring 32 encircling the rod 28 and operatively interposed between the cabinet wall 31 and a pin 33 fixed in the rod 28. In this manner, the before-mentioned independence of action of the rods 12 is permitted and a manual reclosing of the switch is required following its opening by means of the projection of rod 28 against the handle 25 thereof.

It will now be noted that the stoppage of a vehicle following a collision may be additionally insured either by disposing the switch in a position which is not available to the operator while the vehicle is in motion or by rendering difficult the access to the switch in the cabinet. Preferably, and as here shown, the switch cabinet 23 is provided with a door 34 which is arranged to be locked shut by means of a key lock 35, whereby an appreciable time is involved in opening the cabinet for resetting the switch, and the vehicle, therefore, cannot be driven away following a collision before its identity can be ascertained and recorded by witnesses.

While I have herewith disclosed the control provided by my device particularly applied to the engine ignition system, it will be noted that a fuel control valve might be disposed in the cabinet 23 for operation by the rod 28 in the same general manner as is the switch 24, without departing from the spirit of my invention.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, I claim as new and desire to secure by Letters Patent of the United States, the following:

1. In combination with a motor driven vehicle having the motor thereof controlled by an electric circuit, a bumper disposable along a side of the vehicle, a second bumper disposable horizontally outwardly of said first bumper and provided with inwardly extending members at spaced points therealong, brackets mounted on said first bumper and provided with guideways arranged to slidably receive said members for longitudinal reciprocation therein, yieldable means operative to normally position said second bumper in an outer position, a shaft carried on said brackets and provided with crank arms so related to said members that an inward movement of either of the members will independently effect a rotative displacement thereof, a itch in said circuit arranged to be manual- disposed to permit the operation of said tor to drive said vehicle, and means oper- ve upon a rotative displacement of said ift to dispose said switch in an inoperative sition.

2. In a motor driven vehicle having the tor thereof controlled by an electric cir- t, a normally extended bumper disposed across a side of the vehicle and displaceable toward the vehicle, and means arranged to be set upon an inward displacement of the bumper to so effect said circuit as to render said motor inoperative while said bumper is displaced and following its return thereafter to its normal position.

In testimony whereof I affix my signature.

JOHN A. AUSTIN.